US008856582B2

(12) United States Patent
George et al.

(10) Patent No.: US 8,856,582 B2
(45) Date of Patent: Oct. 7, 2014

(54) TRANSPARENT FAILOVER (75) Inventors: Mathew George, Bellevue, WA (US); David M. Kruse, Kirkland, WA (US); James T. Pinkerton, Sammamish, WA (US); Roopesh C. Battepati, Sammamish, WA (US); Tom Jolly, Redmond, WA (US); Paul R. Swan, Sammamish, WA (US); Mingdong Shang, Bellevue, WA (US); Daniel Edward Lovinger, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 524 days.

(21) Appl. No.: 13/174,271

(22) Filed: Jun. 30, 2011

(65) Prior Publication Data

US 2013/0007518 A1   Jan. 3, 2013

(51) Int. Cl.
*G06F 11/00* (2006.01)
*G06F 11/20* (2006.01)
*H04L 29/08* (2006.01)
*G06F 11/14* (2006.01)

(52) U.S. Cl.
CPC ........ *G06F 11/1443* (2013.01); *G06F 11/2033* (2013.01); *H04L 67/142* (2013.01); *H04L 67/1002* (2013.01); *H04L 67/141* (2013.01); *G06F 11/2038* (2013.01); *H04L 67/06* (2013.01)
USPC ............................................ 714/4.11; 714/15

(58) Field of Classification Search
CPC ................... G06F 17/30165; G06F 17/30194; H04L 67/14–67/148
USPC .................................. 714/4.11, 15
See application file for complete search history.

(56) References Cited

U.S. PATENT DOCUMENTS

| 4,399,504 A | 8/1983 | Obermarck |
| 4,780,821 A | 10/1988 | Crossley |
| 4,791,566 A | 12/1988 | Sudama |
| 4,825,354 A | 4/1989 | Agrawal |
| 4,887,204 A | 12/1989 | Johnson |
| 4,891,785 A | 1/1990 | Donohoo |
| 4,914,570 A | 4/1990 | Peacock |

(Continued)

FOREIGN PATENT DOCUMENTS

| EP | 1 259 045 A2 | 11/2002 |
| EP | 1 259 045 A3 | 11/2002 |

(Continued)

OTHER PUBLICATIONS

Microsoft Computer Dictionary, Microsoft Press, Fifth Edition, 2002, p. 486.

(Continued)

*Primary Examiner* — Michael Maskulinski
(74) *Attorney, Agent, or Firm* — Henry Gabryjelski; Kate Drakos; Micky Minhas (57) ABSTRACT Described are embodiments directed at persistent handles that are used to retain state across network failures and server failovers. Persistent handles are requested by a client after a session has been established with a file server. The request for the persistent handle includes a handle identifier generated by the client. The server uses the handle identifier to associate with state information. When there is a network failure or a server failover, and a reconnection to the client, the handle identifier is used to identify replayed requests that if replayed would create an inconsistent state on the server. The replayed requests are then appropriately handled.

20 Claims, 5 Drawing Sheets

(56) References Cited

U.S. PATENT DOCUMENTS

| | | |
|---|---|---|
| 5,008,853 A | 4/1991 | Bly |
| 5,109,519 A | 4/1992 | Zimmet |
| 5,113,519 A | 5/1992 | Johnson |
| 5,202,971 A | 4/1993 | Henson |
| 5,218,696 A | 6/1993 | Baird et al. |
| 5,261,051 A | 11/1993 | Masden et al. |
| 5,265,261 A | 11/1993 | Rubin et al. |
| 5,313,646 A | 5/1994 | Hendricks et al. |
| 5,349,642 A | 9/1994 | Kingdon |
| 5,375,207 A | 12/1994 | Blakely et al. |
| 5,410,697 A | 4/1995 | Baird |
| 5,437,013 A | 7/1995 | Rubin et al. |
| 5,452,447 A | 9/1995 | Nelson |
| 5,491,752 A | 2/1996 | Kaufman et al. |
| 5,493,728 A | 2/1996 | Solton |
| 5,513,314 A | 4/1996 | Kandasamy |
| 5,522,042 A | 5/1996 | Fee et al. |
| 5,535,375 A | 7/1996 | Eshel et al. |
| 5,560,008 A | 9/1996 | Johnson et al. |
| 5,588,117 A | 12/1996 | Karp et al. |
| 5,628,005 A | 5/1997 | Hurvig |
| 5,764,887 A | 6/1998 | Kells et al. |
| 5,826,027 A | 10/1998 | Pedersen et al. |
| 5,931,913 A | 8/1999 | Meriwether et al. |
| 5,933,602 A | 8/1999 | Grover |
| 5,978,802 A | 11/1999 | Hurvig |
| 6,085,247 A | 7/2000 | Parsons et al. |
| 6,092,199 A | 7/2000 | Dutcher |
| 6,125,122 A | 9/2000 | Favichia et al. |
| 6,131,125 A | 10/2000 | Rostoker et al. |
| 6,208,952 B1 | 3/2001 | Goertzel |
| 6,219,799 B1 | 4/2001 | Kandasamy |
| 6,243,862 B1 | 6/2001 | Lebow |
| 6,247,139 B1 | 6/2001 | Walker et al. |
| 6,275,953 B1 | 8/2001 | Vahalia et al. |
| 6,317,844 B1 | 11/2001 | Kleiman |
| 6,324,581 B1 | 11/2001 | Xu et al. |
| 6,349,250 B1 | 2/2002 | Hart et al. |
| 6,349,350 B1 | 2/2002 | Harthorn et al. |
| 6,401,123 B1 | 6/2002 | Shields et al. |
| 6,430,691 B1 | 8/2002 | Di Santo et al. |
| 6,438,691 B1 | 8/2002 | Mao |
| 6,452,903 B1 | 9/2002 | Peck et al. |
| 6,453,354 B1 | 9/2002 | Jiang et al. |
| 6,640,226 B1 | 10/2003 | Shringeri et al. |
| 6,658,476 B1 | 12/2003 | Van |
| 6,829,473 B2 | 12/2004 | Raman et al. |
| 6,883,015 B1 | 4/2005 | Geen et al. |
| 6,910,082 B1 | 6/2005 | Marcotte |
| 6,928,577 B2 | 8/2005 | Moser et al. |
| 7,020,651 B2 | 3/2006 | Ripley |
| 7,103,007 B2 | 9/2006 | Natarajan et al. |
| 7,111,035 B2 | 9/2006 | McClellan et al. |
| 7,111,060 B2 | 9/2006 | Araujo et al. |
| 7,197,535 B2 | 3/2007 | Salesky et al. |
| 7,243,132 B2 | 7/2007 | Choi |
| 7,290,141 B2 | 10/2007 | Sengodan et al. |
| 7,293,192 B2 | 11/2007 | Allen et al. |
| 7,318,102 B1 | 1/2008 | Krause et al. |
| 7,330,910 B2 | 2/2008 | Young et al. |
| 7,339,885 B2 | 3/2008 | Ahrens et al. |
| 7,380,080 B2 | 5/2008 | Hughes |
| 7,380,155 B2 | 5/2008 | Fung et al. |
| 7,383,463 B2 | 6/2008 | Hayden et al. |
| 7,386,889 B2 | 6/2008 | Shay |
| 7,388,866 B2 | 6/2008 | Fan et al. |
| 7,409,420 B2 | 8/2008 | Pullara et al. |
| 7,421,502 B2 | 9/2008 | Czap et al. |
| 7,434,087 B1 | 10/2008 | Singh |
| 7,444,536 B1 | 10/2008 | Jairath |
| 7,451,221 B2 | 11/2008 | Basani et al. |
| 7,453,879 B1 | 11/2008 | Lo |
| 7,457,722 B1 | 11/2008 | Shain et al. |
| 7,509,407 B2 | 3/2009 | Miller et al. |
| 7,526,658 B1 | 4/2009 | He et al. |
| 7,526,668 B2 | 4/2009 | Shitomi et al. |
| 7,539,722 B2 | 5/2009 | Mohamed et al. |
| 7,562,129 B1 | 7/2009 | Lee et al. |
| 7,664,991 B1 | 2/2010 | Gunda et al. |
| 7,673,066 B2 | 3/2010 | Zheng |
| 7,702,745 B2 | 4/2010 | Lin et al. |
| 8,275,815 B2 | 9/2012 | Aronovich et al. |
| 2002/0019874 A1 | 2/2002 | Borr |
| 2002/0073211 A1 | 6/2002 | Lin et al. |
| 2002/0083130 A1 | 6/2002 | Shimada et al. |
| 2002/0152315 A1 | 10/2002 | Kagan et al. |
| 2002/0161980 A1 | 10/2002 | Nishikawa |
| 2003/0018927 A1 | 1/2003 | Gadir et al. |
| 2003/0056069 A1 | 3/2003 | Cabrera et al. |
| 2003/0058277 A1 | 3/2003 | Bowman-Amuah |
| 2003/0093643 A1 | 5/2003 | Britt, Jr. |
| 2003/0093678 A1 | 5/2003 | Bowe et al. |
| 2003/0112754 A1 | 6/2003 | Ramani et al. |
| 2003/0115341 A1 | 6/2003 | Sinha et al. |
| 2003/0126195 A1 | 7/2003 | Reynolds et al. |
| 2003/0140129 A1 | 7/2003 | Livnat et al. |
| 2003/0169859 A1 | 9/2003 | Strathmeyer et al. |
| 2003/0182282 A1 | 9/2003 | Ripley |
| 2004/0003210 A1 | 1/2004 | Duale et al. |
| 2004/0003241 A1 | 1/2004 | Sengodan et al. |
| 2004/0018829 A1 | 1/2004 | Raman et al. |
| 2004/0019660 A1 | 1/2004 | E. et al. |
| 2004/0032876 A1 | 2/2004 | Garg et al. |
| 2004/0044930 A1 | 3/2004 | Keller et al. |
| 2004/0103342 A1 | 5/2004 | Moser et al. |
| 2004/0136325 A1 | 7/2004 | Dobric et al. |
| 2004/0160909 A1 | 8/2004 | Sheynblat |
| 2004/0215794 A1 | 10/2004 | Lauer |
| 2004/0225952 A1 | 11/2004 | Brown et al. |
| 2004/0260748 A1 | 12/2004 | Springer et al. |
| 2004/0267932 A1 | 12/2004 | Voellm et al. |
| 2004/0268118 A1 | 12/2004 | Bazran Bejarano |
| 2005/0010670 A1 | 1/2005 | Greschler et al. |
| 2005/0015511 A1 | 1/2005 | Izmailov et al. |
| 2005/0015747 A1 | 1/2005 | Zatloukal et al. |
| 2005/0021832 A1 | 1/2005 | Bennett et al. |
| 2005/0038828 A1 | 2/2005 | Kaluskar et al. |
| 2005/0041686 A1 | 2/2005 | Roy et al. |
| 2005/0055345 A1 | 3/2005 | Ripley |
| 2005/0060442 A1 | 3/2005 | Beverly et al. |
| 2005/0091212 A1 | 4/2005 | Mohamed et al. |
| 2005/0102537 A1 | 5/2005 | Zheng |
| 2005/0111030 A1 | 5/2005 | Berkema et al. |
| 2005/0114670 A1 | 5/2005 | Bowe et al. |
| 2005/0125378 A1 | 6/2005 | Kawada |
| 2005/0129045 A1 | 6/2005 | Machulsky et al. |
| 2005/0131832 A1 | 6/2005 | Fransdonk |
| 2005/0132077 A1 | 6/2005 | Biran et al. |
| 2005/0138528 A1 | 6/2005 | Ameigeiras et al. |
| 2005/0149817 A1 | 7/2005 | Biran et al. |
| 2005/0177635 A1 | 8/2005 | Schmidt et al. |
| 2005/0182850 A1 | 8/2005 | Kohno |
| 2005/0198113 A1 | 9/2005 | Mohamed et al. |
| 2005/0198247 A1 | 9/2005 | Perry et al. |
| 2005/0198359 A1 | 9/2005 | Basani et al. |
| 2005/0198380 A1 | 9/2005 | Panasyuk et al. |
| 2005/0223014 A1 | 10/2005 | Sharma et al. |
| 2005/0228884 A1 | 10/2005 | Hawley |
| 2005/0246803 A1 | 11/2005 | Spencer |
| 2005/0248803 A1 | 11/2005 | Ohara |
| 2005/0251448 A1 | 11/2005 | Gropper |
| 2005/0257022 A1 | 11/2005 | Hughes |
| 2005/0258022 A1 | 11/2005 | Horton et al. |
| 2005/0262084 A1 | 11/2005 | Tomita |
| 2005/0262103 A1 | 11/2005 | Stakutis et al. |
| 2006/0031519 A1 | 2/2006 | Helliwell et al. |
| 2006/0041698 A1 | 2/2006 | Han et al. |
| 2006/0045005 A1 | 3/2006 | Blackmore et al. |
| 2006/0047818 A1 | 3/2006 | Kruglick et al. |
| 2006/0059118 A1 | 3/2006 | Byrd et al. |
| 2006/0080443 A1 | 4/2006 | Kruglick et al. |
| 2006/0080568 A1 | 4/2006 | Subbaraman et al. |
| 2006/0085328 A1 | 4/2006 | Cohen et al. |
| 2006/0095382 A1 | 5/2006 | Mahlbacher |

(56) References Cited

U.S. PATENT DOCUMENTS

| | | |
|---|---|---|
| 2006/0130107 A1 | 6/2006 | Gonder et al. |
| 2006/0168262 A1 | 7/2006 | Frazer |
| 2006/0206705 A1 | 9/2006 | Khosravi |
| 2006/0271679 A1 | 11/2006 | Mousseau et al. |
| 2006/0271692 A1 | 11/2006 | Kruse et al. |
| 2006/0271697 A1 | 11/2006 | Kruse et al. |
| 2006/0281525 A1 | 12/2006 | Borissov |
| 2007/0150558 A1 | 6/2007 | Teodosiu et al. |
| 2007/0171793 A1 | 7/2007 | Mesut et al. |
| 2007/0192326 A1 | 8/2007 | Angal et al. |
| 2007/0220155 A1 | 9/2007 | Nalla et al. |
| 2008/0151885 A1 | 6/2008 | Horn et al. |
| 2008/0172397 A1 | 7/2008 | Maeda et al. |
| 2009/0077097 A1 | 3/2009 | Lacapra et al. |
| 2009/0138615 A1 | 5/2009 | Cristallo et al. |
| 2009/0172085 A1 | 7/2009 | Arthursson |
| 2009/0222582 A1 | 9/2009 | Josefsberg et al. |
| 2009/0319661 A1 | 12/2009 | Shiozawa et al. |
| 2009/0327798 A1 | 12/2009 | D'Amato et al. |
| 2010/0042715 A1 | 2/2010 | Tham et al. |
| 2010/0161855 A1 | 6/2010 | Mohamed et al. |
| 2010/0185704 A1 | 7/2010 | George et al. |
| 2011/0040826 A1 | 2/2011 | Chadzelek et al. |
| 2012/0151249 A1 | 6/2012 | Swan et al. |
| 2013/0007180 A1 | 1/2013 | Talpey et al. |
| 2013/0066941 A1 | 3/2013 | Kruse et al. |
| 2013/0067095 A1 | 3/2013 | Kruse et al. |
| 2013/0091199 A1 | 4/2013 | Kruse et al. |
| 2013/0097211 A1 | 4/2013 | Kruse et al. |
| 2013/0304932 A1 | 11/2013 | Kruse et al. |

FOREIGN PATENT DOCUMENTS

| | | |
|---|---|---|
| EP | 1 727 056 | 11/2006 |
| JP | 60-019341 | 1/1985 |
| JP | 62-297927 | 12/1987 |
| JP | 63-061148 | 3/1988 |
| JP | 63-205747 | 8/1988 |
| JP | 64-061148 | 3/1989 |
| JP | 02-101847 | 4/1990 |
| JP | 03-048558 | 3/1991 |
| JP | 03-074745 | 3/1991 |
| JP | 04-172039 | 6/1992 |
| JP | 04-229746 | 8/1992 |
| JP | 05-089048 | 4/1993 |
| JP | 05-143488 | 6/1993 |
| JP | 06-075890 | 3/1994 |
| JP | 10-313342 | 11/1998 |
| JP | 11-055314 | 2/1999 |
| JP | 2001-094613 | 4/2001 |
| JP | 2003-016766 | 1/2003 |
| JP | 2003-069610 | 3/2003 |
| JP | 2003-281091 | 3/2003 |
| JP | 2003-125022 | 4/2003 |
| JP | 2004-005427 | 1/2004 |
| JP | 2004-229143 | 8/2004 |
| JP | 2005-322016 | 11/2005 |
| JP | 2007-49755 | 2/2007 |
| JP | 3967758 | 6/2007 |
| KR | 10-1994-0001700 | 3/1994 |
| KR | 10-0860152 | 9/2008 |
| WO | WO 03/096646 | 11/2003 |

OTHER PUBLICATIONS

U.S. Appl. No. 11/182,251, Amendment and Response filed Oct. 11, 2012, 2 pgs.
U.S. Appl. No. 12/964,749, Office Action mailed Jan. 29, 2013, 17 pgs.
U.S. Appl. No. 13/663,827, Office Action mailed Jan. 29, 2013, 16 pgs.
U.S. Appl. No. 13/664,012, Office Action mailed Jan. 25, 2013, 19 pgs.
Chinese 4th Office Action in Application 200510127998.2, mailed Nov. 16, 2011, 7 pgs.
Chinese 5th Office Action in Application 200510127998.2, mailed Mar. 2, 2012, 8 pgs.
Chinese Notice of Allowance in Application 2005101279978.2, mailed Dec. 5, 2011, 4 pgs.
Japanese Office Notice of Allowance in Application 2006-307121 mailed Feb. 14, 2012, 6 pgs.
Maiworm, Daniel, "Symantec Enterprise Vault", Retrieved at http://www.cstl.com/products/Symantec/Symantec- Enterprise_Vault/File System Archiving.pdf, Feb. 5, 2007, pp. 35.
NTFS Design Goals and Features, Retrieved at http://wininternals.uw.hu/ch12lev1sec4.html, Retrieved Date: Oct. 11, 2010, pp. 9.
Oehme, et al.,"IBM Scale out File Services: Reinventing network-attached storage", Retrieved at http://www-935.ibm.com/services/us/its/pdf/sofs-am-journal-final-07010B.pdf, vol. 52 No. 4/5 Jul./Sep. 200B, 10 Pages.
U.S. Appl. No. 11/182,251, Amendment and Response filed Nov. 4, 2011, 17 pgs.
U.S. Appl. No. 11/182,251, Office Action mailed Jan. 30, 2012, 24 pgs.
U.S. Appl. No. 11/182,989, Amendment and Response filed Dec. 1, 2011, 13 pgs.
U.S. Appl. No. 11/182,989, Office Action mailed Feb. 28, 2012, 20 pgs.
U.S. Appl. No. 11/182,251, Amendment and Response filed May 30, 2012, 14 pgs.
U.S. Appl. No. 11/182,251, Notice of Allowance mailed Jul. 12, 2012, 8 pgs.
U.S. Appl. No. 11/182,989, Amendment and Response mailed May 29, 2012, 11 pgs.
U.S. Appl. No. 11/182,989, Notice of Allowance mailed Jun. 21, 2012, 5 pgs.
Aboba et al., Extensible Authentication Protocol (EAP) [online], See Fast Connect, RFC 3748, Jun. 2004, [Retrieved Mar. 3, 2007], Retrieved from: http://www.ietf.org/rfc/rfc3748.txt?number=3748.
Almeida, "FIFS: A Framework for Implementing User-Mode File Systems in Windows NT", Proceedings of the 3rd USENIX Windows NT Symposium, Jul. 12-15, 1999, 19 pgs.
Alvisi et al., "Low-Overhead Protocols for Fault-Tolerant File Sharing"; In Proceedings of the IEEE 18th International Conference on Distributed Computing Systems; 1998; 10 pgs.
ANSI, Financial Institution Message Authentication (Wholesale), Financial Services Technical Publication, ANSI X9.9-1994, Aug. 15, 1986; 38 pgs.
Asokan et al., Server Supported Signatures, Journal of Computer Security, Fall 1997; 13 pgs.
Bell Labs, Plan 9 default Fossil File System [online], [Retrieved Sep. 17, 2007], Retrieved from: http://plan9.bell-labs.com/magic/man2html/4/fossil; 4 pgs.
Bensaou et al., Credit-Based Fair Queueing (CBFQ): A Simple Service-Scheduling Algorithm for Packet-Switched Networks, IEEE/ACM Transactions on Networking, vol. 9, No. 5, Oct. 2001.
Chinese Office Action dated Apr. 29, 2010 in Application No. 200510127997.8.
Chinese Office Action dated Apr. 29, 2010 in Application No. 200510127998.2.
Chinese Second Office Action dated Mar. 3, 2011 in Application No. 200510127998.2.
Chinese Second Office Action dated Mar. 30, 2011 in Application No. 200510127997.8.
Chinese Third Office Action dated Jul. 7, 2011 in Application No. 200510127998.2.
CIFS http://msdn.microsoft.com/library/default.asp?url= /library/en-us/cifs/protocol/cifs.asp, 2 pgs.
CIFS Oplock File Locking, MSDN, [Retrieved Jan. 7, 2008], Retrieved from: http://msdn2.microsoft.com/en-us/library/aa302210.aspx; 3 pgs.
CIFS or Public SMB Information on Common Internet File System http://support.microsoft.com/default.aspx?scid=kb;en-us;199072; 2 pgs.

(56) References Cited

OTHER PUBLICATIONS

Dehaese, G., *The ISO 9660 File System* [online], May 1995, [Retrieved Sep. 14, 2007], Retrieved from: http://users.pandora.be/it3.consultants.bvba/handouts/ISO9960.html.

Digital Equipment Corporation, *Introduction to RSX-11M* [online, Order No. AA-L763B-TC, RSX-11M Version 4.2, First Printing Sep. 1979, Revised Nov. 1981 and Jul. 1985, [Retrieved Aug. 9, 2007], Retrieved from: http://www.computer.museum.uq.edu.au/RSX-11%20Manuals.html; 65 pgs.

Digital Equipment Corporation, *RSX-11M/M-Plus RMS-11 User's Guide* [online], Order No. AA-L669A-TC, Apr. 1983, [Retrieved Aug. 17, 2007], Retrieved from http://www.computer.museum.uq.edu.au/RSX-11%20Manuals.html.

ECMA, Volume and File Structure for Write-Once and Rewritable Media using Non-Sequential Recording for Information Interchange 3rd Edition [online], ECMA-167, Jun. 1997, [Retrieved Aug. 9, 2007], Retrieved from: http://www.ecma-international.org/publications/files/ECMA-ST/Ecma-167.pdf; 150 pgs.

European Search Report dated Feb. 1, 2011 in Application No. 10013021.0.

European Search Report dated Feb. 15, 2006 in Application No. 05111729.9.

European Search Report dated Feb. 22, 2006 in Application No. 05111729.9.

European Search Report dated Jan. 20, 2006 in Application No. RS113279/US18298905.

European Search Report dated Jan. 20, 2006 in Application No. RS113280/US18225105.

European Search Report dated Jan. 4, 2011 in Application No. 10012923-8.

European Search Report dated Jun. 18, 2008 in Application No. 08008916.2.

European Search Report dated Sep. 19, 2006 in Application No. 055111885.9.

French, Steven M., "A New Network File System is Born: Comparison of SMB2, CIFS, and NFS", retrieved Mar. 23, 2011, 14 pgs.

Gifford et al., *The Cedar File System*, Communications of the ACM, vol. 31, No. 3, Mar. 1998; 11 pgs.

Greenberg et al., "NFILE—A File Access Protool"; Network Working Group; RFC 1037; Dec. 1997; 43 pgs.

Gu et al., "SABUL: A High Performance Data Transfer Protocol"; IEEE Communications Letters; 2001; 11 pgs.

Hartman; "The Zebra Striped Network File System"; Doctoral dissertation at the University of California at Berkeley; 1991; 159 pgs.

Hertel, Implementing CIFS The Common Internet FileSystem [online], [Retrieved Jul. 13, 2007], Retrieved from: http://ubiqx.org/cifs/; 3 pgs.

Hiltunen et al., "Implementing Integrated Fine-Grain Customizable QoS Using Cactus"; The 29th Annual Internation Symposium on Fault-Tolerant Computing (Fast Abstract); Madison, WI; 1999, 2 pgs.

Hitz et al., File System Design for an NFS File Server Appliance [online], Network Appliance, TR 3002, 1994, [Retrieved Aug. 9, 2007], Retrieved from: http://www.netapp.com/library/tr/3002.pdf; 13 pgs.

Hobbit, CIFS: Common Insecurities Fail Scrutiny [online], Avian Research, Jan. 1997, Retrieved from: http://web.textfiles.com/hacking/cifs.txt; 39 pgs.

IBM, IBM Personal Computer Seminar Proceedings, vol. 2, No. 5, Sep. 1984; 13 pgs.

International Organization for Standardization, Banking—Approved algorithms for message authentication—, ISO 8731-1, Jun. 1, 1987; 4 pgs.

Internet Assigned Numbers Authority, Well-Known Port Numbers, http://www.jana.org/assignments/port-numbers, 233 pgs.

Japanese Office Notice of Rejection mailed Apr. 3, 2007 in Application No. 2005-356145.

Japanese Office Notice of Rejection mailed Jan. 15, 2008 in Application No. 2005-356145.

Japanese Office Notice of Rejection mailed Mar. 10, 2006 in Application No. 2005-356146.

Japanese Office Notice of Rejection mailed May 12, 2006 in Application No. 2005-356145.

Japanese Office Notice of Rejection mailed Nov. 10, 2006 in Application No. 2005-356146.

John H. Samba Team Terprstra, "Chapter 32. High Availability Part III. Advanced Configuration", retrieved Mar. 22, 2011, 6 pages.

Kent et al., IP Authentication Header [online], RFC 2402, Nov. 1998, [Retrieved Aug. 9, 2007], Retrieved from: http://tools.ietf.org/html/rfc2402, 20 pgs.

Kent et al., Security Architecture for the Internet Protocol [online], RFC 2401, Nov. 1998, [Retrieved Jun. 6, 2007], Retrieved from: http://www.ietf.rg/rfc/rfc2401.txt? number=2401, 62 pgs.

Klima, "Tunnels in Hash Functions: MD5 Collisions Within a Minute", Version 1, Mar. 2006, Versoin 2 Apr. 2006, Cryptology ePrint Archive, 17 pgs.

Korean Notice of Preliminary Rejection mailed Jan. 21, 2011, Application No. 10-2007-80691.

Korean Notice of Rejection mailed Nov. 17, 2006 in Application No. 10-2005-0124340.

Krawczyk, "HMAC: Keyed-Hashing for Message Authentication", RFC-2104, Feb. 1997, http://www.jetf.org/rfc/rfc2104.txt, 10 pgs.

Leach et al., CIFS Logon and Pass Through Authentication Preliminary Draft [online], Jan. 3, 1997, 22 pgs.

Leach et al., CIFS/E Browser Protocol Preliminary Draft [online], Jan. 10, 1997, 33 pgs.

Leach et al., draft-leach-cifs-print-spec-00.txt, CFIS Printing Specification Preliminary Draft [online], Jan. 31, 1997; 30 pgs.

Leach et al., draft-leach-cifs-rap-spec-00.txt, CFIS Remote Administration Protocol Preliminary Draft [online], Feb. 26, 1997; 39 pgs.

Leach, P. et a., "A Common Internet File System (CIFS/1.0) Protocol Preliminary Draft", draft-leach-cifs-v1-spec-02, Mar. 13, 1997, http://microsoft.com/mscorp/ip/protocols/BSTD/CIFS; 160 pgs.

Leach, P., Naik, D., A Common Internet File System (CIFS/1.0) Protocol Preliminary Draft [online], Dec. 19, 1997. Retrieved from: http://tools.ietf.org/html/draft-leach-cifs-v1-spec-01; 132 pgs.

LeGrow, "Maintenance—MSRPC Update (Version 11) and SMB Update (Version 3)"; cfr-users mailing list; http://list.nfr.com/mailman/listingfo/nfr-users; May 20, 2004; 2 pgs.

Linn, "Generic Security Service Application Program Interface, Version 2, Update 1", RFC 2743, Jan. 2000, http://www.ieft.org/rfc/rfc2743.txt, 90 pgs.

Loafman, Zach, "SMB1/SMB2; A BSD Perspective", retrieved Mar. 22, 2011, 35 pgs.

Morris, "Andrew: A Distributed Personal Computing Environment", Communications of the ACM, vol. 29, No. 3, Mar. 1986, New York, 20 pgs.

MS-SMB2—Preview: Server Message Block (SMB) Version 2 Protocol Specification, copyright 2010 Microsoft Corporation, 309 pgs.

Mullender, "A Distributed File Service Based on Optimistic Concurrency Control", Proceedings of the Tenth ACM Symposium on Operating Systems Principles, Dec. 1-4, 1985, Orcas Island, WA, 14 pgs.

Murphy, Origins and Development of TOPS-20 [online], © 1989, 1996, [Retrieved Aug. 9, 2007], Retrieved from: http://www.opost.com/dlm/tenex/hbook.html; 28 pgs.

National Bureau of Standards, *Computer Data Authentication*, Federal Information Processing Standards Publication 113, May 30, 1985; 9 pgs.

Pawlowski, Brian et al. "The NFS Version 4 Protocol" (Publication date not available), 20 pgs.

Periasamy, Anand Babu, "Next-Gen Linux File Systems: Change Is the New Constant", retrieved Mar. 23, 2011, 4 pages.

Platform SDK: File Systems: Microsoft SMB Protocol and CIFS Protocol Overview http://msdn.microsoft.com/ library/default.asp?url=/library/ en-us/fileio/fs/ microsoft_smb_protocol_and_cifs_protocol_overview.asp; 1 pg.

Pranevich, "The Wonderful World of Linux 2.6"; 2005; 17 pgs.

Rivest, "The MD5 Message-Digest-Algorithm", RFC 1321, Apr. 1992, http://www.jetf.org/rfc/rfc2104.txt, 19 pgs.

Rubin, F., *Message Authentication Using Quadratic Residues* [online], Jan. 31, 1995, [Retrieved Sep. 14, 2007], Retrieved from: http://www.mastersoftware.biz/crypt002.htm; 6 pgs.

(56) References Cited

OTHER PUBLICATIONS

Samba Team, *The Samba Team are pleased to announce Samba1.9. 18* [online], Jan. 7, 1998, [Retrieved Jan. 4, 2008], Retrieved from: http://de.samba.org/samba/history/samba1.9.18.html; 4 pgs.
Satran et al. *Internet Small Computer Systems Interface (iSCSI)* [online], RFC 3720, Apr. 2004, [Retrieved Mar. 3, 2007], Retrieved from: http://www.ietf.org/rfc/rfc3720.txt?number=3720; 67 pgs.
Satyanaryanan et al, "Scalable, Secure and Highly Available Distributed File Access", May 1990, 12 pgs.
Schneier, B., *Applied Cryptography Protocols, Algorithm and Source Code in C Second Edition*, John Wiley & Sons, Inc., © 1996; 788 pgs.
Shepler, S. et al., "Network File System (NFS) Version 4 Protocol", Network Working Group, Request for Comments: 3530, Apr. 2003, 275 pgs.
Shepler, S. et al., "NFS Version 4 Protocol", RFC 3010, Proceedings on the 2nd International System Administration and Networking Conference (SANE2000), Dec. 2000, 212 pgs.
Shepler, S., *NFS Version 4 Design Considerations* [online], RFC 2624, Jun. 1999, [Retrieved Jan. 4, 2008], Retrieved from: http://tools.ietf.org/html/rfc2624; 22 pgs.
SNIA, *Common Internet File System (CIFS) Technical Reference* [online], Mar. 1, 2002, Retrieved from: http://www.snia.org/tech_/activities/CIFS/CIFS-TR-1p00_FINAL.pdf; 150 pgs.
Soules et al., *Metadata Efficiency in a Comprehensive Versioning File System*, May 2002; 33 pgs.
Srinivasan et al., Spritely NFS: Implementation and Performance of Cache-Consistency Protocols [online], May 1989, [Retrieved Jan. 4, 2008], Retrieved from: http://www.hpl.hp.com/techreports/Compaq-DEC/WRL-89-5.pdf; 35 pgs.
Szczerbina, "Novell's NetWare Core Protocol", Dr. Dobb's Journal, Nov. 1993, 17 pgs.
Talpey et al., "NFSv4 Session Extensions, draft-ietf-nfsv4-sess-01"; Internet Draft; The Internet Society; Feb. 2005; 70 pgs.
The Java CIFS Client Library [online], [Retrieved Jul. 13, 2007], Retrieved from: http://jcifs.samba.org/, 8 pgs.
The Open Group; Technical Standard; Protocols for X/Open PC Interworking: SMB, Version 2; http://www.opengroup.org/onlinepubs/9697999099/toc.pdf; retrieved on Sep. 1, 1992; 534 pgs.
Tichy, W., RCS—A System for Version Control [online], Jan. 3, 1991, [Retrieved Aug. 6, 2007], Retrieved from: http://www.cs.purdue.edu/homes/trinkle/RCS/rcs.ps; 20 pgs.
TOPS-20 [online], Wikipedia, [Retrieved Mar. 4, 2007], Retrieved from: http://en.wikipedia.org/wiki/TOPS-20; 4 pgs.
Tridgell, "Inside Microsoft Networking", Jun. 25, 1998, 6 pgs.
U.S. Official Action dated Feb. 2, 2010 cited in U.S. Appl. No. 11/182,989.
U.S. Official Action dated Jan. 25, 2010 cited in U.S. Appl. No. 11/182,251.
U.S. Official Action dated Jul. 23, 2010 cited in U.S. Appl. No. 11/182,989.
U.S. Official Action dated Jul. 30, 2010 cited in U.S. Appl. No. 11/182,251.
U.S. Official Action dated Mar. 13, 2009 cited in U.S. Appl. No. 11/182,251.
U.S. Official Action dated May 14, 2009 cited in U.S. Appl. No. 11/182,989.
Vanwasi, "Unleashing the power of P2P"; Network Magazine India; Apr. 2002; 5 pgs.
Zhu, "The Simple and Protected Generic Security Service Application Program Interface (GSS-API) Negotiation Mechanism", RFC-4178, Oct. 2005, http://www.ietf.org/rfc/rfc4178.txt, 20 pgs.
U.S. Appl. No. 13/663,827, Amendment and Response filed Aug. 6, 2013, 7 pgs.
U.S. Appl. No. 13/663,827, Advisory Action mailed Aug. 22, 2013, 3 pgs.
U.S. Appl. No. 13/663,827, Amendment and Response filed Sep. 9, 2013, 8 pgs.
U.S. Appl. No. 13/663,827, Notice of Allowance mailed Sep. 26, 2013, 11 pgs.
U.S. Appl. No. 13/664,012, Amendment and Response filed Jul. 30, 2013, 12 pgs.
U.S. Appl. No. 13/664,012, Notice of Allowance mailed Sep. 12, 2013, 14 pgs.
U.S. Appl. No. 13/172,757, Amendment and Response filed Aug. 19, 2013, 14 pgs.
U.S. Appl. No. 12/964,749, Amendment and Response filed Aug. 23, 2013, 8 pgs.
U.S. Appl. No. 12/964,749, Notice of Allowance mailed Sep. 5, 2013, 11 pgs.
European Exam Report in Application 05111885.9 mailed Sep. 13, 2007, 5 pgs.
European Invitation to Correct Defects in Application No. 08008916.2 mailed Sep. 4, 2008, 6 pgs.
European Notice of Allowance in Application 05111885.9 mailed Jun. 11, 2008, 6 pgs.
European Notice of Allowance in Application 080089162 mailed Jan. 24, 2011, 6 pgs.
European Notice to Grant in Application 05111885.9 mailed Oct. 9, 2008, 1 page.
Hong Kong Certificate of Grant in Application 07105689.8 mailed Jun. 26, 2009, 2 pgs.
Japanese Office Action in Application 200510127997.8 mailed Aug. 3, 2011, 8 pgs.
Japanese Office Notice of Rejection in Application 2006-307121 mailed Aug. 12, 2011, 5 pgs.
U.S. Appl. No. 11/182,989, Office Action mailed Sep. 5, 2008, 6 pgs.
U.S. Appl. No. 11/182,989, Amendment and Response mailed Nov. 26, 2008, 12 pgs.
U.S. Appl. No. 11/182,989, Amendment and Response mailed Aug. 14, 2009, 11 pgs.
U.S. Appl. No. 11/182,989, Amendment and Response mailed Oct. 19, 2009, 6 pgs.
U.S. Appl. No. 11/182,989, Amendment and Response mailed May 3, 2010, 14 pgs.
U.S. Appl. No. 11/182,989, Amendment and Response mailed Oct. 29, 2010, 14 pgs.
U.S. Appl. No. 11/182,989, Office Action mailed Sep. 1, 2011, 19 pgs.
U.S. Appl. No. 11/182,251, Office Action mailed Aug. 22, 2008, 7 pgs.
U.S. Appl. No. 11/182,251, Office Action mailed Nov. 6, 2008, 4 pgs.
U.S. Appl. No. 11/182,251, Amendment and Response filed Nov. 26, 2008, 12 pgs.
U.S. Appl. No. 11/182,251, Amendment and Response filed Jun. 15, 2009, 14 pgs.
U.S. Appl. No. 11/182,251, Amendment and Response filed Sep. 14, 2009, 7 pgs.
U.S. Appl. No. 11/182,251, Amendment and Response filed Apr. 26, 2010, 17 pgs.
U.S. Appl. No. 11/182,251, Amendment and Response filed Nov. 30, 2010, 17 pgs.
U.S. Appl. No. 11/182,251, Office Action mailed Aug. 4, 2011, 23 pgs.
U.S. Appl. No. 13/228,818, Amendment and Response filed Oct. 18, 2013, 24 pgs.
Chinese 1st Office Action in Application 201110329007.4, mailed Oct. 10, 2013, 13 pgs.
U.S. Appl. No. 13/228,732, Amendment and Response filed Nov. 8, 2013, 15 pgs.
U.S. Appl. No. 13/228,818, Amendment and Response filed Nov. 25, 2013, 28 pgs.
U.S. Appl. No. 13/172,757, Office Action mailed Dec. 6, 2013, 27 pgs.
U.S. Appl. No. 12/964,749, Notice of Allowance mailed Nov. 15, 2013, 2 pgs.
PCT International Search Report and Written Opinion in International Application PCT/US2011/063618, mailed Jun. 28, 2012, 9 pgs.
Chinese Notice of Allowance in Application 2005101279982, mailed Aug. 20, 2012, 4 pgs.
U.S. Appl. No. 13/228,732, Office Action mailed Jul. 8, 2013, 16 pgs.

(56) References Cited

OTHER PUBLICATIONS

U.S. Appl. No. 13/228,818, Office Action mailed Jul. 18, 2013, 18 pgs.
U.S. Appl. No. 12/964,749, Office Action mailed May 23, 2013, 13 pgs.
Indian First Exam Report in Application 3305/DE/L2005, mailed Mar. 28, 2013, 2 pgs.
PCT International Search Report and Written Opinion in International Application PCT/US2012/041049, mailed Jan. 17, 2013, 12 pgs.
PCT International Search Report and Written Opinion in International Application PCT/US2012/054038, mailed Feb. 20, 2013, 10 pgs.
Chinese Notice of Entering into Substantive Examination in Application 201210331041.X, mailed Mar. 6, 2013, 3 pgs.
PCT International Search Report and Written Opinion in International Application PCT/US2012/041703, mailed Feb. 14, 2013, 13 pgs.
PCT International Search Report and Written Opinion in International Application PCT/US2012/054039, mailed Feb. 27, 2013, 11 pgs.
U.S. Appl. No. 12/964,749, Amendment and Response filed Apr. 29, 2013, 9 pgs.
U.S. Appl. No. 13/172,757, Office Action mailed Apr. 19, 2013, 23 pgs.
U.S. Appl. No. 13/663,827, Amendment and Response filed Apr. 29, 2013, 10 pgs.
U.S. Appl. No. 13/664,012, Amendment and Response filed Apr. 24, 2013, 10 pgs.
U.S. Appl. No. 13/664,012, Office Action mailed Apr. 30, 2013, 16 pgs.
U.S. Appl. No. 13/663,827, Office Action mailed May 7, 2013, 16 pgs.
European Intention to Grant in Application 10013021.0, mailed Jan. 28, 2014, 7 pgs.
Chinese 1st Office Action in Application 201110462797.3, mailed Apr. 16, 2014, 11 pgs.
U.S. Appl. No. 13/228,732, Notice of Allowance mailed Mar. 4, 2014, 17 pgs.
U.S. Appl. No. 13/172,757, Amendment and Response filed Mar. 6, 2014, 16 pgs.
Digital Equipment Corporation, *Introduction to RSX-11M* [online, Order No. AA-L763B-TC, RSX-11M Version 4.2, First Printing Sep. 1979, Revised Nov. 1981 and Jul. 1985, [Retrieved Aug. 9, 2007], Retrieved from: http://www.computer.museum.uq.edu.au/RSX-11%20Manuals.html; 186 pgs.
SMB: The Server Message Block Protocol [online], 1999, Retrieved from: http://ubiqx.org/cifs/SMB.html; 143 pgs.
U.S. Appl. No. 13/663,827, Notice of Allowance mailed Jan. 13, 2014, 10 pgs.
U.S. Appl. No. 13/664,012, Notice of Allowance mailed Dec. 24, 2013, 11 pgs.
U.S. Appl. No. 13/663,827, Notice of Allowance mailed Apr. 25, 2014, 10 pgs.
U.S. Appl. No. 13/664,012, Notice of Allowance mailed May 20, 2014, 13 pgs.
U.S. Appl. No. 13/664,012, Amendment and Response filed Mar. 19, 2014, 7 pgs.
U.S. Appl. No. 13/228,818, Office Action mailed Mar. 14, 2014, 18 pgs.
Chinese 2nd Office Action in Application 201110329007.4, mailed Jun. 12, 2014, 8 pgs.
U.S. Appl. No. 13/228,818, Amendment and Response filed Jun. 16, 2014, 15 pgs.
U.S. Appl. No. 13/228,732, Amendment after Allowance filed Jun. 4, 2014, 7 pgs.
U.S. Appl. No. 13/228,732, USPTO response to Amendment after Allowance mailed Jun. 27, 2014, 2 pgs.
U.S. Appl. No. 13/228,818, Office Action mailed Aug. 15, 2014, 17 pgs.

TRANSPARENT FAILOVER

BACKGROUND

Server clusters are commonly used to provide failover and high availability of information to clients. The use of a server cluster allows for transparent failover to clients so that any server failure is transparent to applications requesting server operations on clients. Server clusters can be useful in shared file systems to provide access to file information to several clients in a network. However, issues may arise when the shared file system utilizes a stateful protocol, such as the Server Message Block (SMB) protocol. When a server in a server cluster fails, some stateful protocols do not provide a way to transfer client state from the failed server to an alternative server. Also, file access protocols that do provide for storing some state information do not provide for different components to store different state information.

It is with respect to these and other considerations that embodiments have been made. Also, although relatively specific problems have been discussed, it should be understood that the embodiments should not be limited to solving the specific problems identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Described are embodiments that utilize persistent handles in a shared file system. The persistent handles are used to retain state across network failures and server failovers. Persistent handles are requested by a client after a session has been established with a file server. The request for the persistent handle includes a handle identifier generated by the client. The server uses the handle identifier to associate with state information. When there is a network failure or a server failover, and a reconnection to the client, the handle identifier is used to identify replayed requests that if replayed would create an inconsistent state on the server. The replayed requests are then appropriately handled.

Embodiments may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Non-limiting and non-exhaustive embodiments are described with reference to the following figures.

DETAILED DESCRIPTION

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Figure 1:
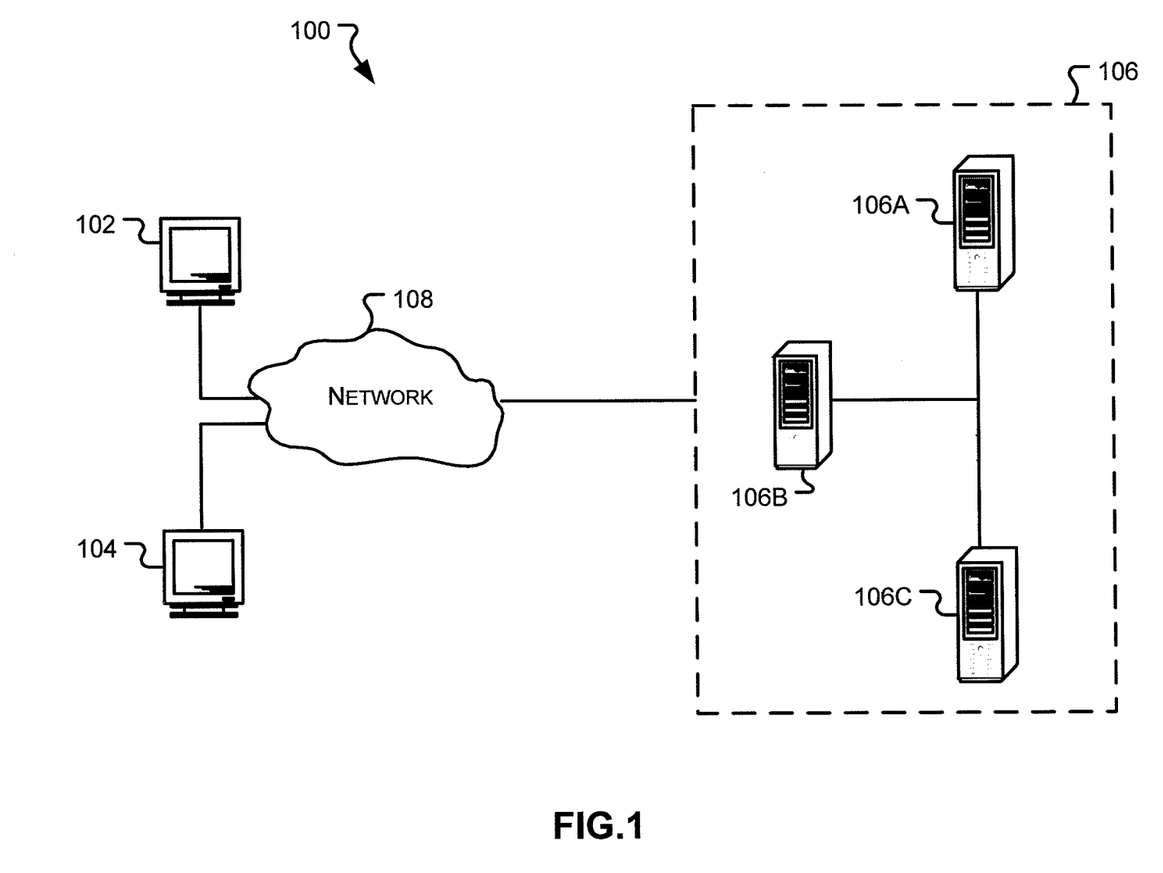
FIG. 1 illustrates a system that may be used to implement embodiments.

FIG. 1 illustrates a system 100 that may be used to implement some embodiments. System 100 includes clients 102 and 104 and a server cluster 106. Clients 102 and 104 communicate with server cluster 106 through network 108. Server cluster 106 stores information that is accessed by applications on clients 102 and 104. Clients 102 and 104 establish sessions with cluster 106 to access the information on cluster 106. Although in FIG. 1 only clients 102 and 104 are shown as communicating with cluster 106, in other embodiments there may be more than two clients accessing information from server cluster 106.

As shown in FIG. 1, server cluster 106 includes servers 106A, 106B, and 106C, which provide both high availability and redundancy for the information stored on cluster 106. In embodiments, the cluster 106 has a file system that is accessed by the clients 102 and 104. Although three servers are shown in FIG. 1, in other embodiments cluster 106 may include more than three servers, or fewer than three servers. In embodiments, applications on clients 102 and 104 request file information from a file system, and, transparent to the application, the file information is retrieved from a shared file system on server cluster 106.

In accordance with one embodiment, servers 106A, 106B, and 106C are utilized to provide consistent availability of the file system stored on cluster 106. This is done by utilizing components on clients 102 and 104 and servers 106A, 106B, and 106C to store state information that can be used to reestablish sessions between clients 102 and 104 and cluster 106 should there be a failure of network 108 or a failure of one of servers 106A, 106B, and 106C. As described in greater detail below, the storing of state information allows clients 102 and 104 to have consistent file access and failover that is transparent to applications running on clients 102 and 104.

The servers, e.g., 106A, 106B, and 106C, of cluster 106, in embodiments, each provide access to file information to clients and are configured to provide consistent availability of the file information to the clients. To illustrate one embodiment, client 102 may send a request to establish a session with a server of cluster 106. For example, client 102 may establish a session with server 106A to access a shared file system stored on server cluster 106. As part of the process of establishing the session, client 102 may utilize a file access protocol. In embodiments, the file access protocol is a version of the Network File System (NFS), or the Server Message Block (SMB) protocol.

The establishment of a session may involve the exchange of a number of negotiate requests and responses transmitted between client 102 and server 106A. In versions of the SMB protocol, there are specifically defined negotiate packets that are used to negotiate the exact version of the protocol that will be used during the session, as well as advertise the capabilities of both the client, e.g., 102, and server, e.g., 106A, to each other. In one embodiment, the negotiate packets may include an indication that the server 106A is part of a cluster, e.g. cluster 106. This allows the client to know that the server 106A can provide consistent availability, in other words, transparent failover capabilities.

Continuing with the example above, after the session is established, client 102 can send a message formatted according to the file access protocol to server 106A for a persistent handle to access a file in the file system. Requesting a persistent handle, in embodiments, indicates that the client would like to utilize the transparent failover capabilities available as a result of server 106A being part of cluster 106. In embodiments, the request includes a handle identifier that is a globally unique identifier.

The server 106A will receive the request for a persistent handle and store the handle identifier with state information for the session with client 102. The storing of state information may merely involve the file server persisting the handle identifier to storage and storing state information in association with the handle identifier. As described in greater detail below, in some embodiments, different types of state information may be stored using separate components, such as a filter. In yet other embodiments, information relating to persistent handles is replicated between nodes and is not stored to persistent storage on the file system. In still other embodiments, information concerning persistent handles is both replicated between nodes and is stored to persistent storage on the file system.

The server 106A sends a response to client 102 granting the persistent handle and access to file information. Client 102 can then proceed to send other requests for performing various operations on the file. For example, client 102 may send requests to read file information, write to the file, enumerate attributes of the file, close the file, and request various locks on the file. Each of the operations requested by the client may result in updating the state information to ensure that if the client is disconnected, the state of the client can be reinstated. This updating may involve saving the additional state information in association with the handle identifier.

At some point, the client 102 may be disconnected from the server. The disconnection may be because of network failure or disruptions, for example. Alternatively, the disconnection may be because of failure of server 106A. In those embodiments involving a network failure, client 102 may detect that a disconnection has occurred and wait for the network to become available to reconnect with the server 106A. In other embodiments, once client 102 detects a failure it sends a request to reconnect to cluster 106, which will provide a failover server to handle the reconnection request.

In either case, client 102 sends a request to reconnect. The request will include the handle identifier. The server 106A, or an alternative server (106B or 106C) will retrieve the state information based on the handle identifier, reestablish the previous state using the state information, and send the client a response indicating that the reconnection is successful. In some embodiments, the reconnection may not be possible, if the previous state information has been lost or is otherwise unavailable. In these situations, the server may treat the reconnection request as a request to establish a session and respond accordingly.

After the session is reestablished, client 102 sends new file access requests. In some embodiments, one of the new file access requests may be replays of previous requests. The replayed request may be of a type that if processed by the server, without recognizing that it is a replay, would create an inconsistent state on the server. The exact type of request depends upon how requests are handled by the file access protocol being used. For example, in versions of the SMB protocol, byte range locks may be requested and granted on portions of a file. Therefore, if the client sent a request to lock portions of a file and the request is completed but the client is not notified prior to the disconnection, the client could replay the previous request. The server would need to be able to identify that the request is a replay. Therefore, in embodiments, the handle identifier sent with the original request for the persistent handle is used to identify replayed requests. Once identified, the replayed requests may be processed in order to avoid an inconsistent state on the server.

In some embodiments, in order to provide transparent failover to applications on the client 102, there may be state information that is stored on the client 102. That is, the server 106A (or a failover server) may not be responsible for storing all of the information that is necessary to restore state after a reconnection. In some embodiments, the client may be responsible for reestablishing some state. For example, if requests to read file information were sent before the disconnection, the server may not be responsible for saving state information regarding the read requests. When the reconnection occurs, the client may be responsible for resending the read requests. Additional description of embodiments, in which state information is restored by different components, is described in greater detail below with respect to FIG. 2.

The foregoing description is merely one example of how the embodiment shown in FIG. 1 may operate. As described in greater detail below, embodiments may involve different steps or operations. These may be implemented using any appropriate software or hardware component or module.

Figure 2:
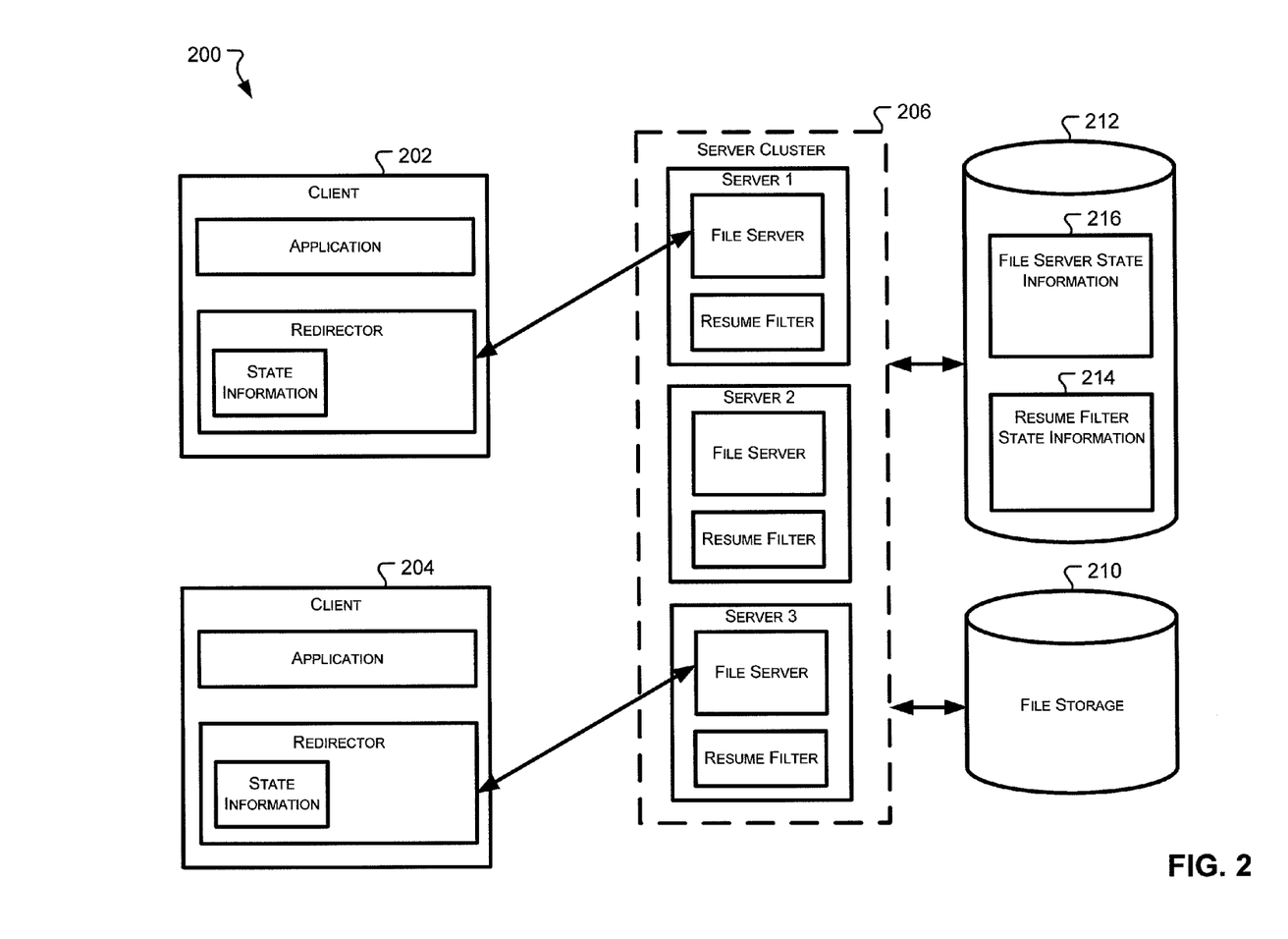
FIG. 2 illustrates a block diagram of a client and file server cluster communicating using a file access protocol consistent with some embodiments.

Turning now to FIG. 2, it shows a block diagram of a software environment 200 with client 202, client 204, and a server cluster 206 with three servers (server 1, server 2, and server 3). Also shown is file storage 210 where the file system stores file information and storage 212 where state information may be stored by one or more of server 1, server 2, and server 3.

As is shown in FIG. 2, client 202 and client 204 each include an application which may request file information. The application may be for example a word processing application, a spreadsheet application, a browser application or any other application which requests access to files. In the embodiment shown in FIG. 2, the files are located in a shared file system stored within file storage 210. Client 202 and client 204 each further include a redirector which redirects request for files from the applications to a file server, which provides access to the shared file system. The redirectors communicate with file servers using a file access protocol. In some embodiments, the file access protocol may be a version of NFS or of the SMB protocol. For purposes of illustration, FIG. 2 will be described assuming that the redirectors in client 202 and client 204 communicate with file servers using a version of the SMB protocol, such as SMB 2.0. Embodiments are however not limited to the use of an SMB protocol.

Server 1, server 2, and server 3 are shown in FIG. 2 as each including a file server. As noted above, the file servers may use a version of the SMB protocol to communicate with the redirectors on client 202 and client 204. Each of server 1, server 2, and server 3 also include a resume filter that is used in some embodiments to store state information for sessions established between a client redirector and a file server.

The use of the SMB protocol to establish a session between a client and a server begins with a redirector, such as the redirector on client 202, sending a negotiate request to a file server such as server 1 in server cluster 206. The redirector and file server exchange negotiate packets to negotiate the version of SMB that will be used for the session. Additionally, during the negotiation, capabilities may also be exchanged. In one embodiment, a file server may include a capability flag in a negotiate response packet sent from the file server to the client to indicate to the client that the file server supports the use of persistent handles. In some embodiments, this is done in situations in which the file server is part of a cluster that can provide consistent availability to a client by failing over to another server in the cluster. In other embodiments, standalone servers may also have this capability in order to be able to reconnect to clients if there is a network failure.

Once the negotiation is completed, the redirector on the client and the file server establish a session. The client redirector can then send file access requests to the file server. In one embodiment, the redirector requests a persistent handle. Versions of the SMB protocol provide for durable handles which can be used for reconnecting to clients that are disconnected. However, they do not necessarily provide for storing and reestablishing state after a client reconnects. Thus, in embodiments, the redirector can send a request for a durable handle with some additional flag and/or indicator to note that the client redirector is requesting a persistent handle. In addition, the client may include a handle identifier that can be used to identify replayed requests after reconnection. Below is one embodiment of a durable handle request structure that may be used in a version of the SMB protocol for requesting the persistent handle:

```
struct SMB2_DURABLE_HANDLE_REQUEST_V2 {
    ULONG Flags;
    GUID HandleId;    // client supplied unique ID for this handle.
    // (used to detect replays.)
    ULONG Timeout;    // timeout in seconds.
    ULONG Reserved;   // must be set to ZERO. }.
```

In response to the request, the file server on server 1, in embodiments, responds by granting the persistent handle and providing a file identifier to the client redirector on client 202. The client redirector is then able to access information from the file associated with the persistent handle and the file identifier. In some embodiments, the client redirector may request a persistent handle for a directory. That is, instead of the persistent handle being associated with an individual file, the handle may be associated with a directory.

In addition to the file server on server 1 granting the persistent handle, the file server will also store state information in storage 212. The state information may be stored in association with the handle identifier generated by the client redirector and may also be stored in association with the file identifier provided to the client redirector on client 202. As described in greater detail below, the file server may directly store state information as file server state information 216. In other embodiments, the file server may utilize a resume filter to store state information. In yet other embodiments, the file server may both directly store state information and also use the resume filter for storing other state information.

After the negotiation is complete, the client redirector sends file access requests using, for example, a version of the SMB protocol. In some embodiments, the file server will store state information for each of the requests received from the client redirector. At some point in time, there may be a disconnect between client 202 and server 1, as a result of a network failure or a failure of server 1, for example. Client 202 can reestablish a connection with server 1 if the failure was based on a network failure, or with a failover server (one of server 2 or server 3). As part of the reconnection, client 202 can send a reconnect request that includes the previously provided handle identifier as well as the file identifier provided by the file server when negotiating the original session. Because the state information is available in storage 212 which is accessible by all of the servers in server cluster 206, a failover server can identify previous state information based on the handle identifier and/or the file identifier provided by the client in the reconnect request. In those embodiments where the client is attempting to reestablish a connection with server 1, the file server on server 1 can also access the state information on storage 212 to reestablish the previous state of the session with the client.

As noted above, in some embodiments, different components in environment 200 are responsible for storing different types of state information in order to provide reestablishment of state to clients that are disconnected. As shown in FIG. 2, each of the file servers includes a resume filter. The resume filter is used in embodiments to store state information for reestablishing state when a client is reconnected. The resume filter is not dependent upon the particular file access protocol used by the file server. In embodiments, the file server will first register with the resume filter in order to store particular state information. Once registered, the file server can pass state information to the resume filter, which stores the state information as resume filter state information 214 in storage 212. In addition to resume filter state information 214, the server can store separate state information, shown as file server state information 216, in storage 212. In embodiments, the different state information can be stored in a different storage location than the resume filter state information 214. The file server state information 216 and the resume filter state information 214 may be stored in any suitable way, such as log files. As described in greater detail below, the types of state information that are stored by the resume filter is, in embodiments, general information, while the server information is more specific state information.

In some embodiments, the client is also responsible for storing some state information. As shown in FIG. 2, clients 202 and 204 store state information that is used to reestablish state when a client is reconnected after a disconnect. In these embodiments, there may be some cost savings in having clients reestablish state instead of requiring the file server to store all of the state information to reestablish the state of a client when it is reconnected after a disconnect. For example, if the file server is required to store all state information, then each time there is some request received from a client redirector, with some operation to perform on a file, the file server will be required to store some information about the requests or operations. Requiring that the client redirector store some of the state information reduces the costs of a file server having to store state information for every request or operation received from the client.

As can be appreciated, the state information that is stored on different components in environment 200 depends upon different design considerations. For example, there may be some information that is important enough that requires the file server to guarantee that the state information is coherent and consistently available, in which case the information should be stored by the file server and/or the resume filter. For example, in order for a server to enforce sharing modes and ensure that new clients requesting access do not interfere with existing client's access, state information must be stored on the server, according to embodiments. Other state information may not be as critical, and some incoherency may be tolerated in the information. As an example, a client may have locally cached file properties. The cached file properties may be requested anew after a client reconnects to a file server following a disconnect.

In one embodiment, where a version of the SMB protocol is used for communication between the client redirector and the file server, the SMB protocol may provide for specific states to be stored by the various components shown in environment 200. In one embodiment, the operations available using the SMB protocol are divided into three groups. State information associated with each group is stored by different components.

The first group may be referred to generally as non-idempotent operations, meaning that if these operations are replayed, e.g., reapplied on a file after already being applied once before a client disconnect, would create an inconsistent state on the file server. In versions of the SMB protocol, byte range locks are an example of operations that require replay detection because these locks are stacked and unstacked. Other examples include appending writes and opens/creates, which can modify disk state, for example by creating new files or overwriting existing files. In embodiments, state associated with these types of operations is stored by the file server because the file server must recognize that these operations are being replayed. In the embodiment shown in FIG. 2, state associated with these operations would be stored by the file servers that are on each of server 1, server 2, and server 3 in storage 212 as part of file server state information 216. The handle identifier provided by the client during negotiation of a session, as described above, is used in some embodiments to identify that the request is a replay of a previous request.

A second group of operations relates to data open operations. These operations may be requests to read, write, execute, or delete information in a file. In order to be able to enforce sharing modes and prevent other clients from affecting existing clients, state regarding these open operations has to be stored on the server side, according to embodiments. State regarding open operations is also stored on the server side to block local operations from interfering with persistent handles. For example, programs running on cluster nodes are prevented from modifying, or otherwise affecting, handles being reserved for clients. In embodiments, state regarding these types of operations is stored by the resume filter. As noted above, the resume filter in embodiments is not specific to the SMB protocol but can also be used when a file server is using a different file access protocol such as NFS. In the embodiment shown in FIG. 2, the resume filter on each of server 1, server 2, and server 3 stores the state information for the open operations in storage 212 as part of resume filter state information 214.

The third group of operations includes operations that if reapplied at the server would not change the final state of the server. These may be referred to as idempotent operations. Some operations in this group include but are not limited to reads, non-appending writes, deletes, renames, metadata-set operations, and metadata-query operations. Lease state also can be stored by the client and need not be persisted by the server. In embodiments, a lease is a mechanism that is designed to allow clients to dynamically alter their buffering strategy in a consistent manner in order to increase performance and reduce network use. The network performance for remote file operations may be increased if a client can locally buffer file data, which reduces or eliminates the need to send and receive network packets. A client may not have to write information into a file on a remote server if the client confirms that no other client is accessing the data. Likewise, the client may buffer read-ahead data from the remote file if the client confirms that no other client is writing data to the remote file.

According to embodiments, lease state does not need to be persisted on the server because the resume filter blocks all creates to a given file while clients are resuming their handles after a failover. This implicitly provides a guarantee that handle leases will never be lost during the failover process if clients reconnect/resume their handles during the grace period. In other words, clients will always get back their handle leases during the resume phase. Furthermore, exclusive leases such as read/write, read/write/handle leases are granted to only a single client at any given time. This implies that there are no other data opens to the file from any other client. So during failover, since the resume filter will not allow new creates to the file until the client holding the exclusive lease has resumed all its handles, there is a guarantee that the client will get back its exclusive lease. Shared leases which do not require an acknowledgement, such as read lease, can be lost at any time without the knowledge of either server or the resume filter because the underlying file system allows the operation which caused the break to proceed. For such leases, the client, in embodiments, assumes that the lease is broken across a failover and purges its cache to prevent stale reads. State for the operations in the third group can therefore be recreated by the client without any additional support from the server. In the embodiment shown in FIG. 2, the redirectors on clients 202 and 204 store the state information for the third group of operations.

In operation, environment 200 allows applications on clients 202 and 204 to request access to files that are stored in file storage 210 in a shared file system. The applications can transparently request file information. The redirectors on the clients will establish a session with one of the servers in cluster 206, as described above, requesting a persistent handle so that the redirector can reconnect and reestablish the session should there be a disconnect. The file server will store state information in storage 212 either directly as file server state information 216 or as resume filter state information 214 using a resume filter. In some embodiments, the client will also store some state information. In the event of a disconnect, the redirector can request to reconnect to the file server, or to a failover server. The state information stored on the server side, e.g., in storage 212, and the client side can then be used to reestablish the previous state of the client. This all occurs transparent to the applications on clients 202 and 204.

As may be appreciated, the above description of environment 200 is not intended to limit the embodiments described herein. FIG. 2 and its description are merely intended to illustrate implementation of some embodiments. In other embodiments, different types of state information may be stored on different components in environment 200. Also, as indicated above, different file access protocols may be used which may determine the type of state information stored as well as what component stores the state information. Thus, embodiments are not limited to what is shown and described in FIG. 2.

The description of FIGS. 3 and 4 below is made using the server message block (SMB) protocol as the file access protocol. However, embodiments are not limited thereto. Any file access protocol including different versions of SMB or the network file system (NFS) may be used in embodiments as the file access protocol. SMB is being used in the description merely for convenience and ease of illustration.

Figure 3:
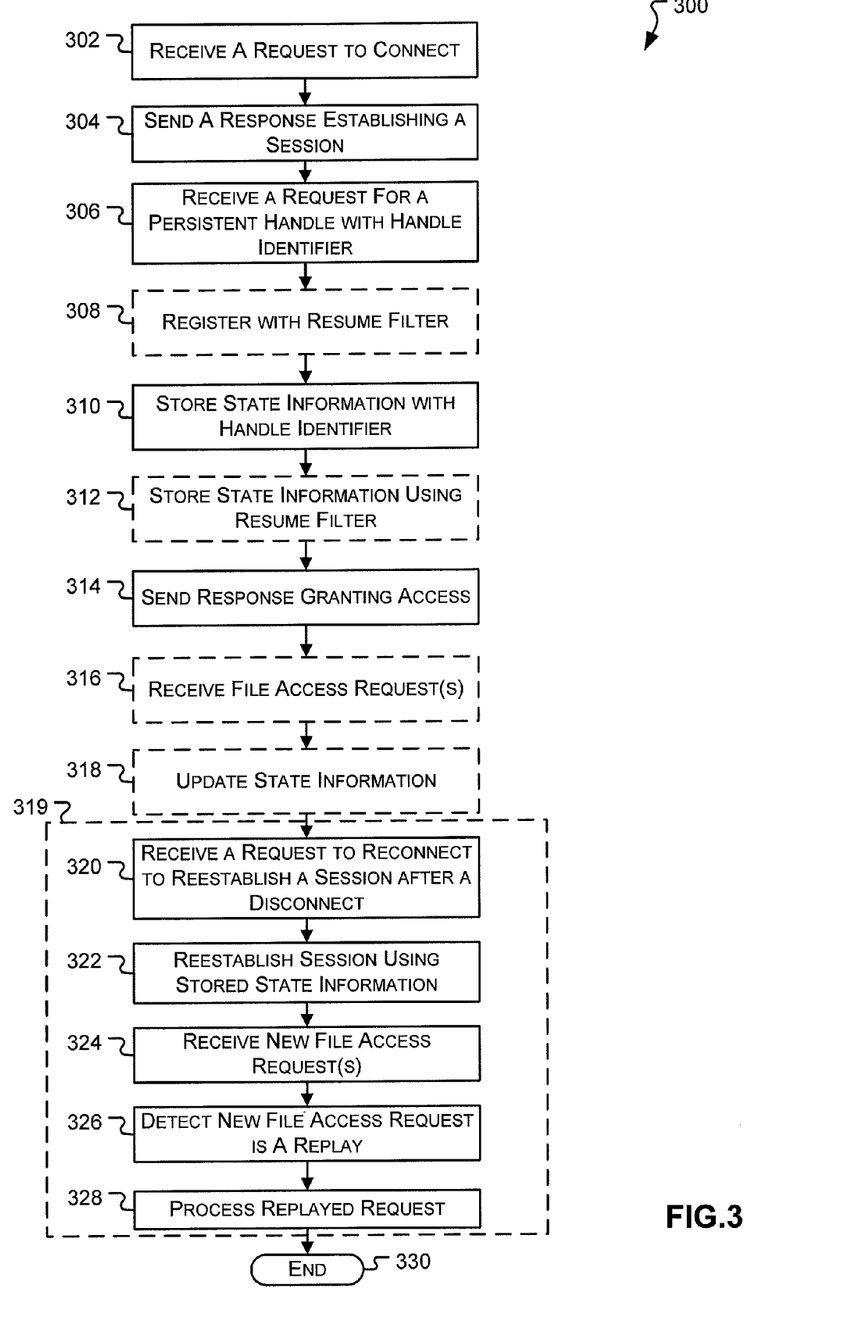
FIG. 3 illustrates an operational flow for providing replay defense on server failover consistent with some embodiments.
Figure 4:
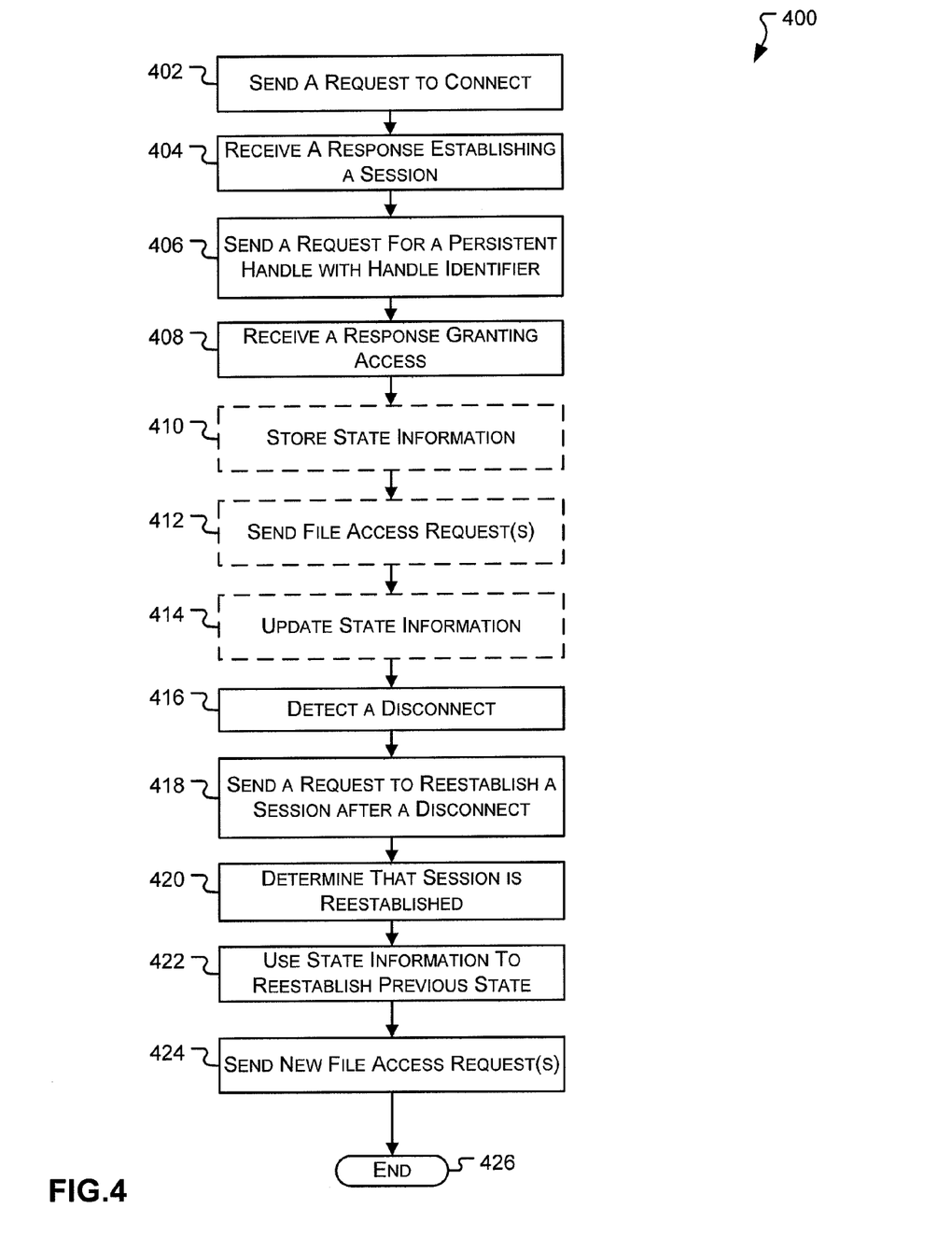
FIG. 4 illustrates operational flows for maintaining consistent availability of file information consistent with some embodiments.

FIGS. 3 and 4 illustrate operational flows 300 and 400 according to embodiments. Operational flows 300 and 400 may be performed in any suitable computing environment. For example, the operational flows may be executed by systems and environments such as illustrated in FIGS. 1 and 2. Therefore, the description of operational flows 300 and 400 may refer to at least one of the components of FIGS. 1 and 2. However, any such reference to components of FIGS. 1 and 2 is for descriptive purposes only, and it is to be understood that the implementations of FIGS. 1 and 2 are non-limiting environments for operational flows 300 and 400.

Furthermore, although operational flows 300 and 400 are illustrated and described sequentially in a particular order, in other embodiments, the operations may be performed in different orders, multiple times, and/or in parallel. Further, one or more operations may be omitted or combined in some embodiments.

Operational flow 300 illustrates steps for providing replay defense on server failover. In embodiments, flow 300 illustrated in FIG. 3 may be performed by a file server that is running on a server that is part of a server cluster, e.g., server 1, server 2, and server 3 of cluster 206 (FIG. 2). Flow 300 begins at operation 302 where a request to connect to a file server is received. The request received at operation 302 is a request to establish a session with the file server in order to access file information stored on a shared file system accessible through the file server. The request may be sent by a client, e.g., clients 202 and 204 (FIG. 2). After operation 302, flow 300 passes to operation 304 where a response is sent indicating that a session has been established. In some embodiments, the request and response sent at operations 302 and 304 may be part of a number of messages that are exchanged between a client and a server to negotiate a session. The exchange of messages may include an exchange of capabilities including the capability of the file server to provide persistent handles.

Operational flow passes from operation 304 to operation 306 where a second request is received for a persistent handle. The request is sent by the client and includes a handle identifier that is generated by the client. The handle identifier is used in embodiments by the server to store state information regarding the session established between the client and the file server. As part of storing the state information, flow 300 may include, in embodiments, operation 308 in which the file server registers with a resume filter in order to store some state information. In embodiments, the resume filter is located between the protocol layer and the underlying storage system and can be used in embodiments to store state information regarding a session established between the file server and the client.

At operation 310 the state information is stored in association with the handle identifier. The state information may be stored in any appropriate form, such as in a table, database, or log file. The storage is persistent and available to the file server for reestablishing state when necessary. The state information may be stored directly by the file server. In other embodiments, flow 300 includes operation 312, in which the resume filter is used to store state information. As indicated above, the file server may register with the resume filter in some embodiments to store state information.

Flow 300 passes from operation 312 to operation 314 where a response is sent to the client granting access to the file using the persistent handle. The response includes a file identifier that is provided by the file server in the response and is also stored in association with the state information stored at operation 310, and optionally at operation 312.

Flow 300 then passes to operation 316, where optionally a number of file access requests are received. The file access requests may include a number of file operations to perform on the file associated with the persistent handle. The operations may be, for example, opens to read/write data, enumerate attributes, lease requests to allow caching of data locally, or other file access operations. The various states associated with receiving the file access requests at operation 316 may be updated at operation 318. That is, when these requests are granted to the client, the state information stored in the previous operations (310 and 312) is updated to reflect the additional state information.

After operation 318, there are a number of additional operations identified within box 319. These operations may be performed as a result of the client being disconnected from the file server. As can be appreciated, in those situations where the file server that originally performed operations 302-318 is unavailable because of a failure, the additional operations within box 319 are performed by a failover server. In other embodiments, where the failure is a result of a network problem, the operations within box 319 are performed by the same file server.

At operation 320, a request to reconnect is received. The request includes the file handle previously provided by the file server, as well as the handle identifier that the client used when requesting the persistent handle. The file server that receives the request at operation 320 can use the handle identifier and the file identifier to look up the state information. As indicated above, this operation may involve using the resume filter in order to retrieve the state information that was previously saved using the resume filter.

Flow 300 passes from operation 320 to operation 322 where the state information is used to reestablish the connection and previous state with the client. After operation 322, flow passes to operation 324 where new file access requests are received. Operation 324 therefore may include a number of operations that each includes receiving a file access request from the client.

Some of the requests received at operation 324 may be replays of previous requests that were sent prior to the disconnect between the file server and the client. As a result, some of these operations if reapplied at the file server may create an inconsistent state. At operation 326, the new file access requests that are replays are detected. In embodiments, this operation may involve identifying the file access requests using the handle identifier previously provided by the client. Once the replay is detected at operation 326, the requests are properly processed at operation 328. That is, if the replayed operations would create an inconsistent state on the file server, they may be ignored if the previous operation was successfully performed. Alternatively, if the previous operation was not successfully performed, then the replayed operation may be applied. Flow 300 then ends at 330.

Operational flow 400 illustrates steps for maintaining consistent availability. In embodiments, flow 400 may be performed by redirectors on clients, such as clients 202 and 204 (FIG. 2), that are communicating with a file server to access files in a shared file system. The client communicates, in embodiments, with the file server using a file access protocol such as a version of the SMB protocol or a version of NFS.

Flow 400 begins at operation 402 where a request to connect to the file server is sent. The request sent at operation 402 is a request to establish a session with the file server in order to access file information stored on a shared file system accessible through the file server. The request may be sent to a file server on a server, e.g., server 1, server 2, and server 3, that is part of a server cluster (FIG. 2). The request is formatted according to a file access protocol such as a version of SMB or NFS.

After operation 402, flow 400 passes to operation 404 where a response is received indicating that a session has been established. In some embodiments, operations 402 and 404 may be part of a number of messages that are exchanged between a client and a server to negotiate a session. The exchange of messages may include an exchange of capabilities including the capability of the file server to provide persistent handles.

Operational flow passes from operation 404 to operation 406 where a request is sent for a persistent handle. As a result of the negotiating process (operations 402 and 404), the client may have been notified that the file server is capable of providing persistent handles. In order to ensure that applications on the client can have their states reestablished after a disconnect and reconnection, the client may request a persistent handle at operation 406. The request includes a handle identifier that is generated by the client.

Flow 400 passes from operation 406 to operation 408 where a response is received granting access to the file using the persistent handle. The response includes a file identifier that is provided by the file server in the response.

At operation 410 state information may, in some embodiments, be stored by the client. The state information is stored in association with the handle identifier and the file identifier provided in the response received granting the persistent handle. The state information may be stored in any appropriate form, such as in a table, database, or log file. The storage is persistent and available to the client for reestablishing state when necessary. As can be appreciated, the state information stored by the client is, in embodiments, state information for operations that can be safely replayed back to the file server without creating an inconsistent state on the file server. The replayed operations may be, for example, leases for locally caching data, reads, writes, deletes, and meta-data enumerations.

Flow 400 passes from operation 410 to operation 412 where the client sends a number of file access requests. Operation 412 may thus involve the sending of several requests to perform file operations, according to embodiments. Following operation 412 is operation 414, where state information on the client is updated. As may be appreciated, operations 414 may occur numerous times, namely each time that a file access request is sent by the client at operation 412.

From operation 414, flow passes to operation 416 where a disconnect is detected. The detection may occur by virtue of a timeout, an event notification or some other means. Following operation 416, a request is sent to reconnect and reestablish the session previously established with the file server at operation 418. The request includes the file handle previously provided by the file server, as well as the handle identifier that the client used when requesting the persistent handle.

Flow 400 passes from operation 418 to operation 420 where a determination is made that the reconnect is successful. After operation 420, flow passes to operation 422 where state information stored on the client is used to reestablish the previous state. Operation 422 may involve sending a number of different requests, including read, write, enumerate, requests for locks or other operations to reestablish the previous state. Flow passes from operation 422 to operation 424, where the client sends new file access requests. Flow ends at 426.

Figure 5:
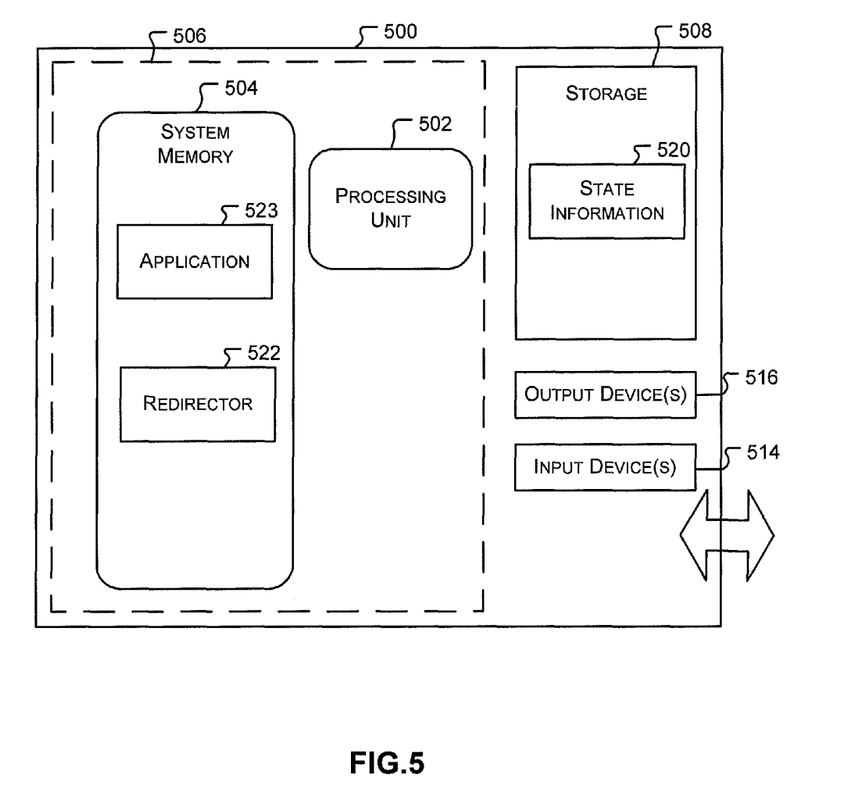
FIG. 5 illustrates a block diagram of a computing environment suitable for implementing embodiments.

FIG. 5 illustrates a general computer system 500, which can be used to implement the embodiments described herein. The computer system 500 is only one example of a computing environment and is not intended to suggest any limitation as to the scope of use or functionality of the computer and network architectures. Neither should the computer system 500 be interpreted as having any dependency or requirement relating to any one or combination of components illustrated in the example computer system 500. In embodiments, system 500 may be used as a client and/or server described above with respect to FIG. 1.

In its most basic configuration, system 500 typically includes at least one processing unit 502 and memory 504. Depending on the exact configuration and type of computing device, memory 504 may be volatile (such as RAM), nonvolatile (such as ROM, flash memory, etc.) or some combination of the two. This most basic configuration is illustrated in FIG. 5 by dashed line 506. In embodiments, system memory 504 stores applications such as application 523, which requests access to file information. System memory 504 also includes redirector 522 that intercepts the requests and communicates them to a file server, according to embodiments.

The term computer readable media as used herein may include computer storage media. Computer storage media may include volatile and nonvolatile, removable and non-removable media implemented in any method or technology for storage of information, such as computer readable instructions, data structures, program modules, or other data. System memory 504, removable storage, and non-removable storage 508 are all computer storage media examples (i.e., memory storage). In embodiments, data, such as state information 520, for example, are stored. Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 500. Any such computer storage media may be part of device 500. Computing device 500 may also have input device(s) 514 such as a keyboard, a mouse, a pen, a sound input device, a touch input device, etc. Output device(s) 516 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Reference has been made throughout this specification to "one embodiment" or "an embodiment," meaning that a particular described feature, structure, or characteristic is included in at least one embodiment. Thus, usage of such phrases may refer to more than just one embodiment. Furthermore, the described features, structures, or characteristics may be combined in any suitable manner in one or more embodiments.

One skilled in the relevant art may recognize, however, that the embodiments may be practiced without one or more of the specific details, or with other methods, resources, materials, etc. In other instances, well known structures, resources, or operations have not been shown or described in detail merely to avoid obscuring aspects of the embodiments.

While example embodiments and applications have been illustrated and described, it is to be understood that the embodiments are not limited to the precise configuration and resources described above. Various modifications, changes, and variations apparent to those skilled in the art may be made in the arrangement, operation, and details of the methods and systems disclosed herein without departing from the scope of the claimed embodiments.

We claim:

1. A computer implemented method of providing consistent availability to clients accessing a shared file system on a server cluster, the method comprising:
   receiving at a file server a request to connect to the file server to access file information in a shared file system, the request to connect being formatted according to a file access protocol, wherein the file server is one of a plurality of servers in a server cluster;
   sending a first response from the file server, the first response establishing a session with a client for allowing access to file information in the shared file system, the first response being formatted according to the file access protocol;
   receiving a request at the file server to open a persistent handle on the file server for accessing a file in the shared file system by the client, the request to open a persistent handle including a handle identifier provided by the client;
   in response to receiving the request to open a persistent handle, the file server:
     storing first state information about the session in association with the handle identifier; and
     sending a second response to the client granting access to the file;
   after a client disconnect, receiving a request to reestablish the session using the persistent handle;
   reestablishing the session using the first state information;
   after reestablishing the session, receiving a new request from the client, the new request including the handle identifier;
   determining, using the handle identifier, that the new request is a replay of a previously sent request.

2. The method of claim 1, wherein the first state information comprises state of an operation that if resent by the client causes the file server to end up in an inconsistent state.

3. The method of claim 2, wherein the file access protocol is a version of the Server Message Block (SMB) protocol.

4. The method of claim 3, wherein the first state information comprises state of one or more of: byte range locks held by the client and create operations sent by the client.

5. The method of claim 3, further comprising:
   before the client disconnect, registering with a resume filter to store second state information regarding the session.

6. The method of claim 5, wherein the second state information comprises state of one or more of: leases held by the client and opens held by the client.

7. The method of claim 5, wherein the reestablishing the session further comprises using the second state information.

8. The method of claim 1, wherein the client disconnect occurs because of a failure of the file server and the reestablishing the connection is performed by a second file server in the server cluster.

9. A computer readable storage medium comprising computer executable instructions that when executed by a processor perform a method of maintaining consistent state, the method comprising:
   sending a request by a client to connect to a server to access file information, the request to connect being formatted according to a file access protocol;
   receiving a first response from the server, the first response establishing a session with the client for allowing access to file information on the server, the first response being formatted according to the file access protocol;
   sending a request to open a persistent handle on the server for accessing a file on the server by the client, the request to open a persistent handle including a handle identifier provided by the client;
   receiving a second response at the client granting access to the file;
   detecting that the client has been disconnected from the server;
   sending a request to reestablish the session using the persistent handle, the request to reestablish the session including the handle identifier;
   determining that the session has been reestablished;
   sending a new request; and
   after the session is reestablished, determining that the new request is a replay of a previously sent request.

10. The computer readable storage medium of claim 9, wherein the server is one of a plurality of servers in a server cluster, and the disconnection occurs because of a failure of the server, wherein the reestablishing the session is performed by a second server of the plurality of servers in the server cluster.

11. The computer readable storage medium of claim 10, wherein the file access protocol is a version of the Server Message Block (SMB) protocol.

12. The computer readable storage medium of claim 9, wherein the new request comprises the handle identifier and is a replay of a request for one or more of: a byte range lock held by the client before the disconnection and a create request sent by the client before the disconnection.

13. A system of providing consistent availability to clients accessing a shared file system on a server cluster, the system comprising:
   at least one processor;
   memory, operatively coupled to the at least one processor and containing instructions that, when executed by the at least one processor, cause the at least one processor to perform a method, the method comprising:
     receiving at a file server a request to connect to the file server to access file information in a shared file system, the request to connect being formatted according to a file access protocol, wherein the file server is one of a plurality of servers in a server cluster;
     sending a first response from the file server, the first response establishing a session with a client for allowing access to file information in the shared file system, the first response being formatted according to the file access protocol;
     receiving a request at the file server to open a persistent handle on the file server for accessing a file in the shared file system by the client, the request to open a persistent handle including a handle identifier provided by the client;
     in response to receiving the request to open a persistent handle, the file server:
       storing first state information about the session in association with the handle identifier; and sending a second response to the client granting access to the file;

after a client disconnect, receiving a request to reestablish the session using the persistent handle;

reestablishing the session using the first state information;

after reestablishing the session, receiving a new request from the client, the new request including the handle identifier;

determining, using the handle identifier, that the new request is a replay of

14. The system of claim 13, wherein the first state information comprises state of an operation that if resent by the client causes the file server to end up in an inconsistent state.

15. The system of claim 14, wherein the file access protocol is a version of the Server Message Block (SMB) protocol.

16. The system of claim 15, wherein the first state information comprises state of one or more of: byte range locks held by the client and create operations sent by the client.

17. The system of claim 15, further comprising:
before the client disconnect, registering with a resume filter to store second state information regarding the session.

18. The system of claim 17, wherein the second state information comprises state of one or more of: leases held by the client and opens held by the client.

19. The system of claim 17, wherein the reestablishing the session further comprises using the second state information.

20. The system of claim 13, wherein the client disconnect occurs because of a failure of the file server and the reestablishing the connection is performed by a second file server in the server cluster.

* * * * *